United States Patent
Yuan et al.

(10) Patent No.: US 10,296,743 B2
(45) Date of Patent: May 21, 2019

(54) METHOD AND DEVICE FOR CONSTRUCTING APK VIRUS SIGNATURE DATABASE AND APK VIRUS DETECTION SYSTEM

(71) Applicant: Conew Network Technology (Beijing) Co., Ltd., Beijing (CN)

(72) Inventors: Guoqing Yuan, Beijing (CN); Haifeng Su, Beijing (CN); Xin Shu, Beijing (CN)

(73) Assignee: Conew Network Technology (Beijing) Co., Ltd., Beijing (CN)

( * ) Notice: Subject to any disclaimer, the term of this patent is extended or adjusted under 35 U.S.C. 154(b) by 314 days.

(21) Appl. No.: 15/124,951

(22) PCT Filed: Mar. 3, 2015

(86) PCT No.: PCT/CN2015/073572
§ 371 (c)(1),
(2) Date: Sep. 9, 2016

(87) PCT Pub. No.: WO2015/135429
PCT Pub. Date: Sep. 17, 2015

(65) Prior Publication Data
US 2017/0017792 A1    Jan. 19, 2017

(30) Foreign Application Priority Data
Mar. 10, 2014 (CN) .......................... 2014 1 0086359

(51) Int. Cl.
*H04L 9/00* (2006.01)
*G06F 21/56* (2013.01)

(52) U.S. Cl.
CPC ...... *G06F 21/564* (2013.01); *G06F 2221/033* (2013.01)

(58) Field of Classification Search
CPC .................................................. G06F 21/564
(Continued)

(56) References Cited

U.S. PATENT DOCUMENTS 7,873,947 B1    1/2011   Lakhotia et al.
9,619,650 B2*   4/2017   Wang .................... G06F 21/563

FOREIGN PATENT DOCUMENTS

CN         101685483 A      3/2010
CN         102779249 A      11/2012
(Continued)

OTHER PUBLICATIONS

International Search Report, dated Mar. 30, 2015, from corresponding International Application No. PCT/CN2015/073572.

*Primary Examiner* — Christopher J Brown
(74) *Attorney, Agent, or Firm* — Wolf, Greenfield & Sacks, P.C.

(57) ABSTRACT

A method and device for constructing an apk virus signature database and an apk virus detection system. The method comprises: obtaining a given sample set, the sample set being composed of N normal apk file samples and N virus-infected apk file samples; for any sample in the given sample set, separately obtaining M signature values of the sample according to M preset signatures; for any sample in the given sample set, separately obtaining M signature values of the sample according to M preset signatures; for any sample subset i (i=1, . . . , 2M), determining whether the sample subset satisfies the following conditions: the ratio of the total number $Ci_{total}$ of samples in the subset to the total number of samples in the given sample set is greater than a preset first threshold and the ratio of the total number $Ci_{virus}$ of virus-infected samples to $Ci_{total}$ is greater than a preset second threshold, and if yes, determining a combination of signature values of M signatures corresponding to the sample subset i as a virus signature; and generating an apk (Continued)

virus signature database comprising a plurality of virus signatures, the apk virus signature database being used for detecting an apk file.

20 Claims, 5 Drawing Sheets

(58) Field of Classification Search
USPC .......................................................... 726/24
See application file for complete search history.

(56)     References Cited

FOREIGN PATENT DOCUMENTS

| | | |
|---|---|---|
| CN | 102831338 A | 12/2012 |
| CN | 103106365 A | 5/2013 |
| CN | 103473506 A | 12/2013 |

* cited by examiner

METHOD AND DEVICE FOR CONSTRUCTING APK VIRUS SIGNATURE DATABASE AND APK VIRUS DETECTION SYSTEM

This application is the national phase of International Application No. PCT/CN2015/073572, titled "METHOD AND DEVICE FOR CONSTRUCTING APK VIRUS SIGNATURE DATABASE AND APK VIRUS DETECTION SYSTEM", filed on Mar. 3, 2015, which claims the priority of a Chinese patent application No. 201410086359.5, entitled "METHOD AND DEVICE FOR CONSTRUCTING AN APK VIRUS SIGNATURE DATABASE AND APK VIRUS DETECTION SYSTEM" and filed before the China Patent Office on Mar. 10, 2014, which is hereby incorporated into the present application by reference in its entirety.

TECHNICAL FIELD

The present application relates to the technical field of information security application, and specifically to a method and device for constructing an apk virus signature database and an apk virus detection system.

TECHNICAL BACKGROUND

Android operating system is an open source operating system developed by Google and the Open Handset Alliance, which is mainly applied in intelligent mobile terminals (e.g. smart phones, tablets, etc.). The open nature of the Android system renders it getting the favor of many cell phone manufacturers and users, and also causes more and more developers joining in the development of Android system applications.

Developers compile the codes of Android system applications, and then package the compiled source codes into a file that can be recognized, installed, and operated by Android operating system. The format of such a file is APK (android application package) format. Users upload the file in the apk format to an Android device such as an Android simulator or Android mobile phones and the like to operate it, and the installation is completed.

However, also due to the open nature of the Android system, virus writers can directly insert virus codes into the source codes of Android system applications, to achieve the purposes of charging the phone bill, consuming cell phone traffic, and stealing users' privacy. For example, some virus creators decompile Android system applications, get corresponding program codes, and insert the virus codes into the program codes which are originally security, then repackage the program codes containing virus codes, and finally send the apk carrying virus codes to cell phone users via various channels.

In the prior art, by means of hash algorithm, the hash values of a large number of virus-infected apk files are extracted, a virus signature database containing a plurality of hash values is constructed, and the target apk file is detected. If the hash value of the target apk file is identical to any one of the hash values in the virus signature database, then it is determined that the target file contains viruses.

However, if virus writers modify one character of the target apk file containing viruses, the hash value of the modified target apk file will change, thus bypassing the detection of the method in the prior art.

SUMMARY

The present application aims to solve at least one of the above mentioned issues.

To this end, the first purpose of the present application is to propose a method for constructing an apk virus signature database. After characters of the target apk file containing viruses are changed, a plurality of signatures of the target apk file will not be changed completely, thus incapable of bypassing the detection of the apk virus signature database constructed with the method of the embodiments of the present application.

The second purpose of the present application is to propose a device for constructing an apk virus signature database.

The third purpose of the present application is to propose a system for detecting an apk virus.

The forth purpose of the present application is to propose a storage medium.

The fifth purpose of the present application is to propose an application program.

The sixth purpose of the present application is to propose a system for constructing an apk virus signature database.

In order to achieve the above purposes, the method for constructing an apk virus signature database in the first aspect of embodiments of the present application comprises the following steps: obtaining a given sample set, wherein the sample set includes N normal apk file samples and N virus-infected apk file samples, and wherein, the apk file is an Android system application program installation package file, and N>1; obtaining M signature values respectively for any sample in the given sample set according to M preset signatures, wherein, each signature corresponds to 2 kinds of signature values; combining the signature values of the M signatures, and dividing the given sample set into $2^M$ sample subsets according to the combined result; for any of the sample subsets i ($i=1, \ldots, 2^M$), determining whether the sample subset satisfies the following conditions: a ratio of total number $Ci_{total}$ of samples in the subset to total number 2N of samples in the given sample set is greater than a preset first threshold and a ratio of total number $Ci_{virus}$ of virus-infected samples to $Ci_{total}$ is greater than a preset second threshold; if yes, determining a combination of signature values of M signatures corresponding to the sample subset i as a virus signature; and generating an apk virus signature database comprising a plurality of virus signatures, the apk virus signature database being used for detecting an apk file.

According to the method for constructing an apk virus signature database in embodiments of the present application, a plurality of signatures of a large number of apk file samples can be combined to obtain a plurality of virus signatures, and the apk virus signature database containing the plurality of virus signatures is constructed. After characters of the apk file containing viruses are changed, the plurality of signatures of the apk file will not be changed completely, thus incapable of bypassing the detection of the apk virus signature database constructed with the method of the embodiments of the present application, which has a better effect to the detection of the apk viruses.

In order to achieve the above purposes, the device for constructing an apk virus signature database in the second aspect of embodiments of the present application comprises: a sample set obtaining module used to obtain a given sample set, wherein the sample set includes N normal apk file samples and N virus-infected apk file samples, and wherein, the apk file is an Android system application program installation package file, and N>1; a signature value extracting module used to obtain M signature values respectively for any sample in the given sample set according to M preset signatures, wherein, each signature corresponds to 2 kinds of signature values; a sample subset dividing module used to combine the signature values of the M signatures, and divide the given sample set into $2^M$ sample subsets according to the combined result; a determining module used to, for any sample subset i (i=1, ..., $2^M$), determine whether the sample subset satisfies the following conditions: a ratio of total number $Ci_{total}$ of samples in the subset to total number 2N of samples in the given sample set is greater than a preset first threshold and a ratio of total number $Ci_{virus}$ of virus-infected samples to $Ci_{total}$ is greater than a preset second threshold, if yes, determine a combination of signature values of M signatures corresponding to the sample subset i as a virus signature; and a virus signature database generating module used to generate an apk virus signature database comprising a plurality of virus signatures, wherein the apk virus signature database is used for detecting an apk file.

According to the device for constructing an apk virus signature database in the embodiments of the present application, a plurality of signatures of a large number of apk file samples can be permutated and combined to obtain a plurality of virus signatures, and the apk virus signature database containing the plurality of virus signatures is constructed. After characters of the apk file containing viruses are changed, the plurality of signatures of the apk file will not be changed completely, thus incapable of bypassing the detection of the apk virus signature database constructed with the method of the embodiments of the present application, which has a better effect to the detection of the apk viruses.

In order to achieve the above purposes, the system for detecting an apk virus of the third aspect of embodiments of the present application comprises: an device for constructing an apk virus signature database and a device for detecting an apk virus; wherein, the device for constructing an apk virus signature database comprises: a sample set obtaining module used to obtain a given sample set, wherein the sample set includes N normal apk file samples and N virus-infected apk file samples, and wherein, the apk file is an Android system application program installation package file, and N>1; a signature value extracting module used to obtain M signature values respectively for any sample in the given sample set according to M preset signatures, wherein, each signature corresponds to 2 kinds of signature values; a sample subset dividing module used to combine the signature values of the M signatures, and divide the given sample set into $2^M$ sample subsets according to the combined result; a determining module used to, for any sample subset i (i=1, ..., $2^M$), determine whether the sample subset satisfies the following conditions: a ratio of total number $Ci_{total}$ of samples in the subset to total number 2N of samples in the given sample set is greater than a preset first threshold and a ratio of total number $Ci_{virus}$ of virus-infected samples to $Ci_{total}$ is greater than a preset second threshold, if yes, determine a combination of signature values of M signatures corresponding to the sample subset i as a virus signature; and a virus signature database generating module used to generate an apk virus signature database comprising a plurality of virus signatures, wherein the apk virus signature database is used for detecting an apk file. The device for detecting an apk virus comprises: a file obtaining module used to obtain a target apk file; a file detection module used to detect the target apk file according to an apk virus signature database constructed by the device for constructing an apk virus signature database; a file recognizing module used to determine that the target apk file contains viruses when a subfile of the target apk file contains any one of virus signatures in the apk virus signature database.

According to the apk detection system of embodiments of the present application, an apk file can be detected using the apk virus signature database of embodiments of the present application after the apk file is obtained, as long as a subfile of the apk file includes any one of signatures in the apk virus signature database. With the present application, the apk can still be recognized as a virus-infected apk even though the virus writer modifies characters of the apk file, which has a better effect to the detection of apk viruses.

In order to achieve the above purposes, the forth aspect of embodiments of the present application further provides a storage medium, wherein, the storage medium is used to store an application program, which is used to execute the method for constructing an apk virus signature database of the first aspect of embodiments of the present application while operating.

In order to achieve the above purpose, the fifth aspect of embodiments of the present application further provides an application program, wherein, the application program is used to execute the method for constructing an apk virus signature database of the first aspects of embodiments of the present application while operating.

In order to achieve the above purpose, the sixth aspect of embodiments of the present application further provides a system for constructing an apk virus signature database, comprising: at least a processor and a memory coupled to the at least a processor, wherein the memory is used to store executable program code; the at least a processor runs a program corresponding to the executable program code by reading the executable program code stored in the memory to perform the following steps:

obtaining a given sample set, wherein the sample set includes N normal apk file samples and N virus-infected apk file samples, and wherein, the apk file is an Android system application program installation package file, and N>1;

obtaining M signature values respectively for any sample in the given sample set according to M preset signatures, wherein, each signature corresponds to 2 kinds of signature values;

combining the signature values of the M signatures, and dividing the given sample set into $2^M$ sample subsets according to the combined result;

for any of the sample subsets i (i=1, ..., $2^M$), determining whether the sample subset satisfies the following conditions:

a ratio of total number $Ci_{total}$ of samples in the subset to total number 2N of samples in the given sample set is greater than a preset first threshold and a ratio of total number $Ci_{virus}$ of virus-infected samples to $Ci_{total}$ is greater than a preset second threshold, if yes, determining a combination of signature values of M signatures corresponding to the sample subset i as a virus signature; and generating an apk virus signature database comprising a plurality of virus signatures, the apk virus signature database being used for detecting an apk file.

In order to achieve the above purpose, embodiments of the present application further provides a system for detecting an apk virus, comprising: at least a processor and a memory coupled to the at least a processor, wherein the memory is used to store executable program code; the at least a processor runs a program corresponding to the executable program code by reading the executable program code stored in the memory to perform the following steps for constructing an apk virus signature database:

obtaining a given sample set, wherein the sample set includes N normal apk file samples and N virus-infected apk file samples, and wherein, the apk file is an Android system application program installation package file, and N>1;

obtaining M signature values respectively for any sample in the given sample set according to M preset signatures, wherein, each signature corresponds to 2 kinds of signature values;

combining the signature values of the M signatures, and dividing the given sample set into $2^M$ sample subsets according to the combined result;

for any of the sample subsets i (i=1, ..., $2^M$), determining whether the sample subset satisfies the following conditions:

a ratio of total number $Ci_{total}$ of samples in the subset to total number 2N of samples in the given sample set is greater than a preset first threshold and a ratio of total number $Ci_{virus}$ of virus-infected samples to $Ci_{total}$ is greater than a preset second threshold, if yes, determining a combination of signature values of M signatures corresponding to the sample subset i as a virus signature; and generating an apk virus signature database comprising a plurality of virus signatures, the apk virus signature database being used for detecting an apk file;

and wherein, the at least a processor further performs the following steps for detecting an apk virus:

obtaining a target apk file;

detecting the target apk file according to an apk virus signature database constructed by the device for constructing an apk virus signature database; and determining that the target apk file contains a virus when a subfile of the target apk file contains any one of virus signatures in the apk virus signature database.

Part of additional aspects and advantages of the present application will be given below; other part will become apparent from the following description or be understood by practice of the present application.

BRIEF DESCRIPTION OF THE DRAWINGS

In order to describe the technical solutions of embodiments of the present application and of the prior art more clearly, the drawings to be used in embodiments and prior art will be briefly introduced, obviously, the drawings described below are just for some embodiments of the present application and other drawings may be obtained by those skilled in the art without any creative effort.

DETAILED DESCRIPTION

Embodiments of the present application will be described in detail, examples of the embodiment is shown in the figures, wherein, identical or similar reference number indicating identical or similar elements or elements with identical or similar function from beginning to end. Embodiments described below by reference of the figures are exemplary, which is just for interpretations of the present application which cannot be comprehended as limitation of the present application. Contrarily, embodiments of the present application fall into all variation, modification and equivalents within spirits and contents of appended claims.

What is to be understood is, in the description of the present application, terms "first", "second" and etc. are just used for the purpose of description and cannot be understood as indicating or implying relative importance. what needs to be explained is that, unless there is in the description of the present application, terms "joint", "connect" should be comprehended broadly, for example, it may be fixed connection, and may also be removable connection, or integrated connection; it may be mechanical connection and may also be electrical connection; it may be direct connection and may also be indirectly connection via intermediate medium. For ordinary ones skilled in the art, they can understand specific implications in the present application of said terms in specific circumstance. Moreover, unless otherwise stated, in the description of the present application, the meaning of "multiple" is two or more than two.

Any process or method described in other way in the flow chart or herein can be comprehended as, representing one or more modules, segments or parts of codes of executable instructions for steps used to realize particular logical function of process, and the scope of preferred implementation of the present application comprises additional realization, wherein, functions can be executed without the shown or discussed order including by a basically simultaneous way or a reverse order according to related functions, which should be understood by those skilled in the field which embodiments of the present application belong to.

It should be understood that, embodiments of the present application are applicable to mobile terminals with Android operating system (Android system is an operating system that is free and has open source codes based on Linux); it should be understood that in the embodiments of the present application, a mobile terminal may be a hardware equipment with Android operating system, such as a mobile phone, a tablet computer and the like.

The method and device for constructing an apk virus signature database and the system for detecting an apk virus according to embodiments of the present application will be described with reference to figures.

Figure 1:
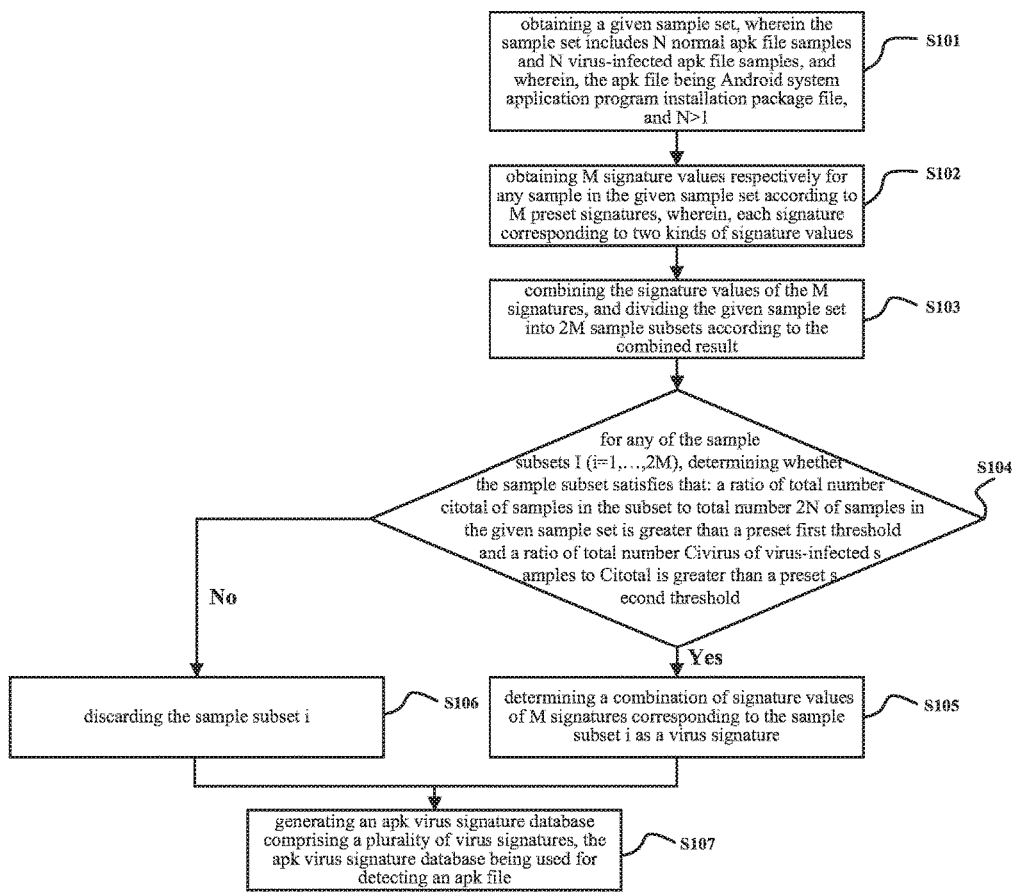
FIG. 1 is a flow chart of a method for constructing an apk virus signature database according to an embodiment of the present application.

FIG. 1 is a flow chart of a method for constructing an apk virus signature database according to an embodiment of the present application. As shown in FIG. 1, the method for constructing an apk virus signature database comprising the following step:

S101, obtaining a given sample set, wherein the sample set includes N normal apk file samples and N virus-infected apk file samples, and wherein, the apk file being Android system application program installation package file, and N>1.

In embodiments of the present application, a normal apk file sample can be obtained from the official website of the apk file, which is a virus-free, safe file, for example, a qq installation file downloaded from Tencent's official website, which is a virus-free, safe file. A virus-infected apk file sample is a file containing viruses or a file that presenting potential safety risks, which will threaten the property and privacy of a user once operated on the user's Android devices. For example, after the virus-infected apk is operated on a user's Android device, this apk program may perform behaviors such as charging the phone bill, consuming traffic, and stealing users' privacy actions and the like.

It can be understood that, the larger number of the selected apk file samples are, the more accurate detection of the virus-infected apk file by the obtained virus signatures is. By selecting a huge number of virus-infected apk files and normal apk file samples of the same number, embodiments of the present application on the one hand provide a reliable protection in number; and increase the distinguishing degree of virus signatures since normal apk files of the same number is used as relevant files.

In S102, M signature values are obtained respectively for any sample in the given sample set according to M preset signatures, wherein, each signature corresponding to two kinds of signature values.

In embodiments of the present application, the preset M signatures can be common detecting signatures of 2N apk file samples in the given sample set. For example, the preset signatures can be 32 signatures such as "whether it contains advertisement sdk (software development kit) function or not", "whether it contains recording function or not", "the number of advertisement sdks contained", "the number of payment sdks contained", "whether it contains backgrounder signatures or not", "whether it contains a function of deleting short messages or not", "whether it contains running on startup function or not", "whether the name of an apk package is the name of a risky package or not", "whether it contains a function of uninstalling applications or not", "whether it contains a function of installing new applications or not", "whether it contains a function of deleting contacts or not", "whether it contains a function of obtaining a root privilege or not", "whether it contains a function of adding a new contact or not", "whether it contains a function of deleting a browser bookmark or not", "whether it contains a function of adding a browser bookmark or not", "whether it contains a function of auto-downloading a file or not", "whether it contains a function of auto-sending a short message or not", "the number of system events monitored by an apk file", "whether it contains a function of dynamically loading a jar package or not", "whether it contains a function of closing other applications or not", "the number relevant functions sent by calling a short message", "the number of functions called in a reflection way", "whether it contains an sub apk file in an apk file", "whether the apk file monitors network change events or not", "whether the apk file has applied an equipment management authority", "whether it contains a function of dynamically loading a dex file or not", "whether it contains a function of obtaining a list of installation applications or not", "the number of files in the asset dictionary after the apk is decompressed", "whether the apk file signature contains a risky string or not", "whether the apk file has the authority of popping out a window in other applications", "whether it contains a function of using a default icon provided by a compiler itself", "the number of files whose suffixes do not match with the actual format thereof in the specific directories of the decompressed apk files".

It can be understood that the signature values obtained when using the above preset signatures to detect the apk files all belong to 2 kinds. For example, when detecting an apk sample file using the preset signature "whether it contains the function of deleting a browser bookmark or not", the obtained signature values is "the apk sample file contains the function of deleting a browser bookmark" or "the apk sample file does not contain the function of deleting a browser bookmark".

For example, when detecting an apk sample file using the preset signature "the number of advertisement sdks", the obtained signature values is "the number of advertisement sdks is greater than the preset value" or "the number of advertisement sdks is not greater than the preset value". The specific form of a signature value is not defined in embodiments of the present application.

It can be understood that the more the selected detecting signatures are, the more accurate detection of the virus-infected apk file by the obtained virus signatures is. The number of detecting signatures is not limited in embodiments of the present application, and in actual application, the number of detecting signatures can be set according to particular requirements.

In a specific implementation of the present application, S102 can be implemented by the following steps:

extracting M signatures respectively for any sample in the given sample set according to M preset signatures; and processing the extracted signatures and obtaining M signature values of each sample in the given sample set.

For example, according to the six signatures "whether it contains a function of dynamically loading a jar package or not", "whether it contains a function of closing other applications or not", "the number of relevant functions sent by calling a short message", "the number of functions called in a reflection way", "whether it contains an sub apk file in an apk file", "whether the apk file monitors network change events or not", 6 signatures of an apk sample in given sample set are extracted, and the 6 extracted signatures are "it contains a function of dynamically loading a jar package", "it contains a function of closing other applications", "the number of relevant functions sent by calling a short message is 6", "the number of functions called in a reflection way is 8", "it does not contain an sub apk file in an apk file", "the apk file monitors network change events" respectively.

Further, numerical processing can be performed to the extracted signatures to obtain M signature values of each sample in the given sample set, wherein, signature values are integer values.

For example, numerical processing is performed to the 6 signatures extracted in the above embodiment, and "it contains the function of closing other applications" is denoted as 1; "it contains the function of dynamically loading a jar package" is denoted as 1; "it does not contain an sub apk file in an apk file" is denoted as 0; "the apk file monitors network change events" is denoted as 1; "the number of relevant functions sent by calling a short message is 6" is denoted as 6; and "the number of functions called in a reflection way is 8" is denoted as 8.

In S103, the signature values of the M signatures are combined, and the given sample set is divided into $2^M$ sample subsets according to the combined result.

In the embodiments of the present application, each signature corresponds to two signature values, and according to the combinational algorithm in statistics, for M signatures, there are $2^M$ combination modes, thus the given sample set is divided into $2^M$ sample subset. For example, for a given sample set, assuming that the first signature is "whether it contains the function of dynamically loading a jar package or not", after numerical processing is performed to the signature, "it contains the function of dynamically loading a jar package" corresponds to the signature value "1", and "it does not contain the function of dynamically loading a jar package" corresponds to the signature value "0". Similarly, the second signature "whether it contains the function of closing other applications or not" also corresponds to two signature values "0" and "1", the third signature "the number of relevant functions sent by calling a short message" corresponds to two signature values "≥6" and "<6". The signature values of the three signatures are permuted and combined, and there are $2^3$ modes, which respectively are: {0, 0, ≥6}, {0, 0, <6}, {0, 1, ≥6}, {0, 1, <6}, {1, 0, ≥6}, {1, 0, <6}, {1, 1, ≥6} and {1, 1, <6}, thus the given sample set is divided into 8 sample subsets.

In a specific implementation, S103 can be implemented by the following steps:

generating a binary tree for the sample set using a binary tree algorithm; said given sample set is a root node of the binary tree, wherein number of samples corresponding to the root node is 2N, M decisions are made to the root node to form a binary tree with $2^M$ leaf nodes and a depth of M+1, and wherein, signature values of j-th (j=1, 2, 3, ..., M) signature are used as decision conditions for each decision.

Figure 2:
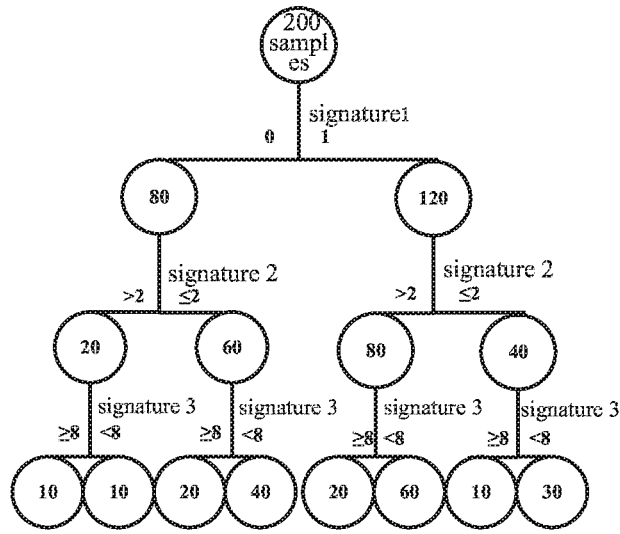
FIG. 2 is a schematic diagram of dividing sample subsets using a binary tree algorithm according to an embodiment of the present application.

In particular, as shown in FIG. 2, assuming that the given sample set contains 200 sample file, signature 1 corresponds to two signature values "0" and "1", signature 2 corresponds to two signature values ">2" and "≤2", and signature 3 corresponds to two signature values "≥8" and "<8". Taking the given sample set containing 200 sample files as the root node, and signature 1, signature 2, signature 3 as the decision condition, decision is made to the root node three times. After the first decision is made to the node root, two first-level leaf nodes are obtained; a second decision is made to the obtained two leaf roots, and four second-level leaf nodes are obtained; a third decision is made to the obtained four leaf roots, eight leaf nodes are obtained, which are the obtained sample subsets by dividing.

It can be understood that, if signature 1, signature 2 and signature 3 is used as the decision criterion, the presenting location thereof in the binary tree will not influence the final decision results, and users may set the presenting locations of each signature in the binary tree by themselves according to their needs, which is not limited specifically in embodiments of the present application.

It is noted that a "binary tree" is just a specific realization algorithm for dividing the given sample set into sample subsets, and it cannot limit the present application.

Herein, the signature value used as a decision condition can be "the apk sample file contains the function of deleting a browser bookmark" or "the apk sample file does not contain the function of deleting a browser bookmark" and it can also be "the number of advertisement sdks contained is greater than the preset value" or "the number of advertisement sdks contained is not greater than the preset value" etc. In the embodiments of the present application, the decision condition for each level is different. However, there are not limitations for specific decision condition for each level, and in actual application, proper decision conditions can be chosen according to specific scenes.

In S104, for any sample subset i (i=1, 2, 3, ..., $2^M$), it is determined whether the sample subset satisfies the following conditions:

a ratio of total number $Ci_{total}$ of samples in the subset to total number 2N of samples in the given sample set is greater than a preset first threshold and a ratio of the total number $Ci_{virus}$ of virus-infected samples to $Ci_{total}$ is greater than a preset second threshold, if yes, turning to S105, otherwise, turning to S106.

Assuming that the total number of samples in the given sample set 2N is 20000, the total number $Ci_{total}$ of samples of i-th sample subset $C_{itotal}$ is 2000, and the preset first threshold being 5%, the ratio of 2000/20000 is 10% which is greater than the preset first threshold 5%; assuming that the total number $Ci_{virus}$ of virus-infected samples in this subset is 1900, and the preset second threshold is 95%, the ratio of 1900/2000 is 96% being greater than the preset second threshold 95%; when both the two conditions are satisfied, turning to S105, otherwise turning to S106.

It is noted that the first threshold is selected such that the total number of samples in the selected sample subset is in certain proportion to the total number of samples in the given sample set, so that the selected sample subset is representative to some extent. It is understood that, the higher the first threshold is, the more representative the selected sample subset is. The second threshold is selected such that the total number $Ci_{virus}$ of virus-infected samples in the selected sample subset is in certain proportion to the total number of samples in the given sample subset, so that the selected sample subset is representative to some extent. It is understood that, the higher the second threshold is, the more representative the selected sample subset is.

Optionally, the first threshold in embodiments of the present application is 5%, and the second threshold is 95%. The total number 2N of samples in the given sample set is not limited in embodiments of the present application, and in actual application, the first threshold, the second threshold and the total number 2N of samples in the given sample set can be set according to specific situations.

In S105, a combination of signature values of M signatures corresponding to the sample subset i is determined as a virus signature.

In particular, as shown in FIG. 2, assuming that the first threshold is 20%, the second threshold is 95%, signature 1 is "whether the apk file signature contains risky strings or not", signature 2 is "the number of system events monitored by an apk file", signature 3 is "the number of files whose suffixes do not match the actual format thereof in the specific directory where an apk file is decompressed", the leaf nodes are numbered as 1, 2, ..., 8 from left to right in order, there are 59 virus-infected samples in leaf node 6, the ratio of the number of virus-infected samples in the leaf node 6 to the total number of samples in the root node 6 is 60/200, which is higher than the second threshold and the ratio of the number of virus-infected samples contained in the leaf node 6 to the total number of samples contained in the leaf node 6 is 59/60, which is also higher than the second threshold, then the decision conditions needed for dividing the root node into leaf node 6 are determined, the signatures corresponding to these decision conditions respectively are: "whether the apk file signature contains risky strings or not"

corresponding to the signature value "1", "the number of system events monitored by an apk file" corresponding to the signature value ">2", "the number of files whose suffixes do not match the actual format thereof in the specific directory where an apk file is decompressed" corresponding to the signature value "≥8", and the virus signature combined by these signatures are "the apk file signature contains risky strings" and "the number of system events monitored by an apk file is greater than 2" and "the number of files whose suffixes do not match the actual format thereof in the specific directory where an apk file is decompressed is equal to or greater than 8".

It is noted is that embodiments of the present application only take three signature for example, and in actual application, users may set the number of signatures according to their actual needs.

In S106, the sample subset i is discarded;

In S107, an apk virus signature database comprising a plurality of virus signatures is generated, wherein the apk virus signature database is used for detecting apk files;

In embodiments of the present application, the $2^M$ sample subsets are distinguished one by one and the combination of signature values of M signatures corresponding to the sample subsets meeting the preset conditions is determined as a virus signature; those sample subsets not meeting the preset conditions are discarded; and the apk virus signature database is generated with the plurality of virus signatures of a plurality of sample subsets meeting the preset conditions after the $2^M$ sample subsets are processed. For example, if there are 1000 sample subsets that meet the conditions, and 1000 sample subsets correspond to 1000 virus signatures, then there are 1000 virus signatures contained in the generated apk virus signature database.

According to the above steps, the $2^M$ sample subsets divided from the given sample set are filtered one by one, and the decision conditions which start from the root node of the sample subsets meeting the conditions are combined into a virus signature, so as to generate an apk virus signature database containing a plurality of virus signatures, which is used detect an apk file.

When the sample subset i cannot simultaneously meet the two conditions, i.e. ratio of the total number $Ci_{total}$ of samples in the subset to the total number 2N of samples in the given sample set is greater than a preset first threshold and the ratio of the total number $Ci_{virus}$ of virus-infected samples to $Ci_{total}$ is greater than a preset second threshold, then the sample subset is discarded.

Figure 3:
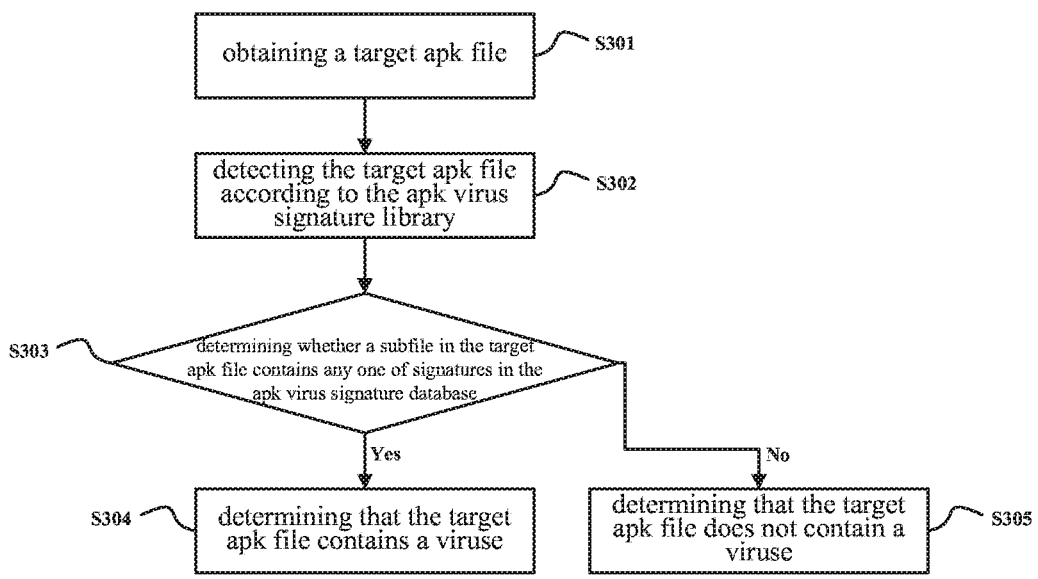
FIG. 3 is a flow chart of a method for detecting an apk virus according to an embodiment of the present application.

FIG. 3 is a flow chart of a method for detecting an apk virus according to an embodiment of the present application. In the embodiment, an apk file can be detected using the constructed apk virus signature database, as shown in FIG. 3, and the specific steps may includes:

S301, obtaining a target apk file; S302, detecting the target apk file according to an apk virus signature database; wherein, steps for constructing the virus signature database has been described in detail in the method embodiment of the present application in FIG. 1, which will not be described needlessly.

In a particular implementation of the present application, said step S302 may be implemented by the following steps:

detecting subfiles of the following types in the target apk file: classes.dex, androidmanifest.xml and ifest.mf.

In S303, it is determined whether a subfile in the target apk file contains any one of signatures in the apk virus signature database, if yes, turning to S304, otherwise turning to S305.

In S304, it is determined that the target apk file contains a virus.

In embodiments of the present application, apk files can be detected using an apk virus signature database. As long as the target apk file contains any one of signatures in the apk virus signature database, then this apk target file is determined as an apk file containing a virus.

In S305, it is determined that the target apk file does not contain a virus;

It can be seen from the above embodiments that, in embodiments of the present application, by permuting and combining a plurality of signatures of a large number of apk file samples, a plurality of virus signatures are obtained, and a apk virus signature database containing the plurality of virus signatures is constructed, which is used for the detection of a target apk file. Since the virus signatures contained in the apk virus signature database are general virus signatures rather than virus signatures for a certain sample or for a family, and the generation of virus signatures is established on basis of a large number of samples, in an actual detection process, after characters of the apk file containing viruses are changed, the plurality of signatures of the apk file will not be changed completely, and the virus-infected characteristic of the target apk file can still be recognized, and thus the recognition rate of the virus variants and virus family is improved and new unknown samples can be detected.

Figure 4:
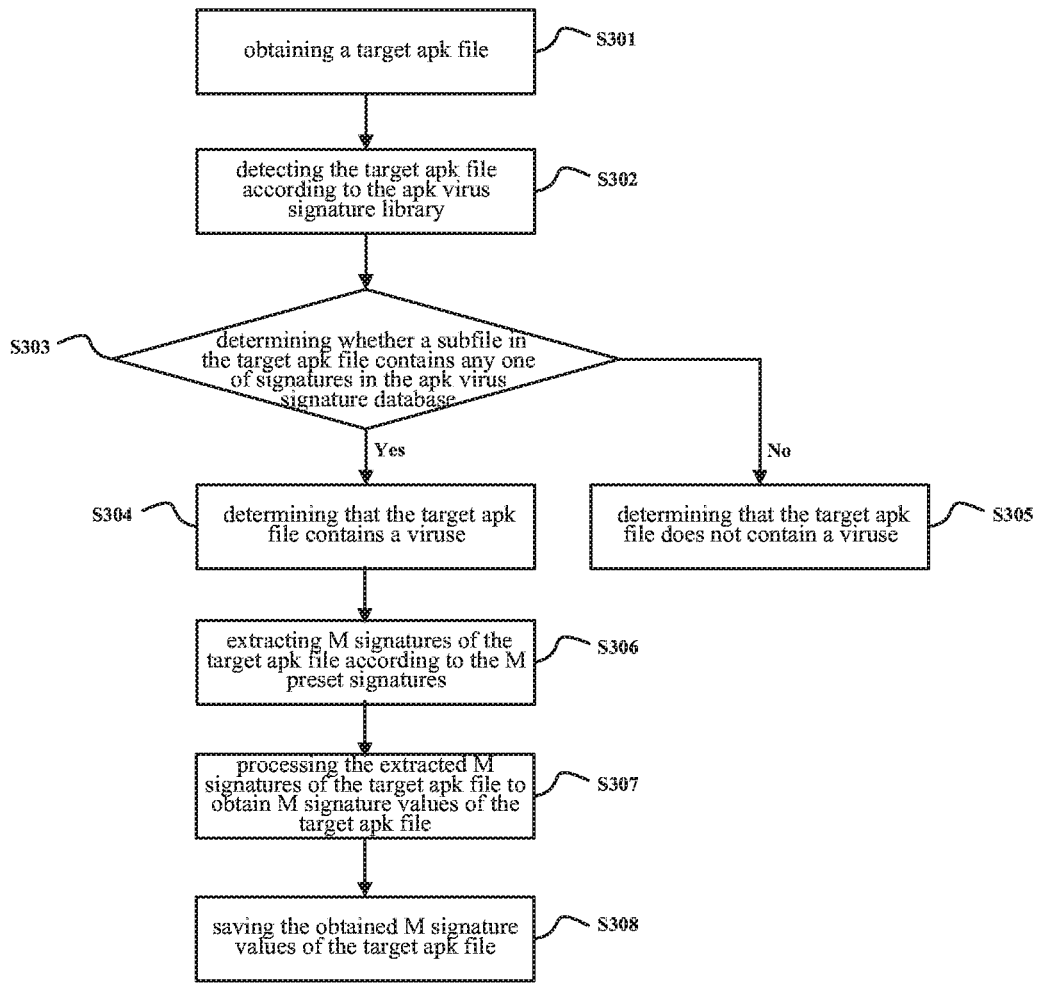
FIG. 4 is a flow chart of a method for detecting an apk virus according to another embodiment of the present application.

FIG. 4 is a flow chart of a method for detecting an apk virus according to another embodiment of the present application. In the embodiment, as shown in FIG. 4, S306, S307, and S308 may be added after S305; S306, S307, and they will be described in detail hereafter.

In S306, M signatures of the target apk file are extracted according to the M preset signatures.

In S307, the Extracted M signatures of the target apk file are processed to obtain M signature values of the target apk file.

S308, saving the M obtained signature values of the target apk file.

It is understood that, saving the signature values of a virus-infected apk file has a guiding significance for constructing an apk virus signature database.

In order to realize the above embodiments, the present application provides a device for constructing an apk virus signature database.

Figure 5:
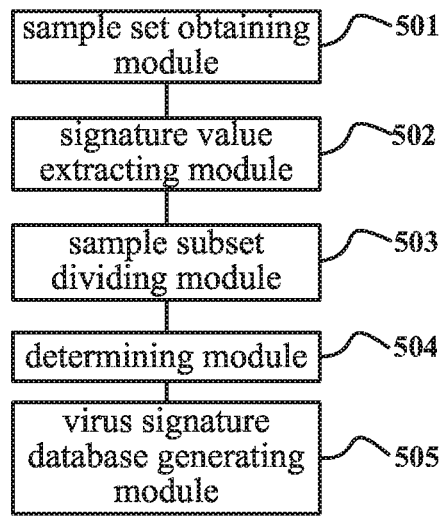
FIG. 5 is a structure schematic diagram of a device for constructing an apk virus signature database according to an embodiment of the present application.

FIG. 5 is a schematic structure diagram of a device for constructing an apk virus signature database according to an embodiment of the present application. As shown in FIG. 5, the device for constructing an apk virus signature database comprising: a sample set obtaining module 501, a signature value extracting module 502, a sample subset dividing module 503, a determining module 504 and a virus signature database generating module 505.

In particular, the sample set obtaining module 501 is used to obtain a given sample set, wherein the sample set includes N normal apk file samples and N virus-infected apk file samples, and wherein, the apk file is an Android system application program installation package file, and N>1;

The signature value extracting module 502 is used to obtain M signature values respectively for any sample in the given sample set according to M preset signatures, wherein, each signature corresponds to 2 kinds of signature values, Optionally, the M preset signatures can be common detection signatures for 2N apk file samples in the given sample set.

The sample subset dividing module 503 is used to combine the signature values of the M signatures, and divide the given sample set into $2^M$ sample subsets according to the combined result;

The determining module 504 is used to, for any sample subset i (i=1, ..., $2^M$), determine whether the sample subset satisfies the following conditions:

a ratio of total number $Ci_{total}$ of samples in the subset to total number 2N of samples in the given sample set is greater than a preset first threshold and a ratio of total number $Ci_{virus}$ of virus-infected samples to $Ci_{total}$ is greater than a preset second threshold, if yes, determining a combination of signature values of M signatures corresponding to the sample subset i as a virus signature.

The virus signature database generating module 505 is used to generate an apk virus signature database comprising a plurality of virus signatures, wherein the apk virus signature database is used for detecting an apk file.

In a particular implementation of the present application, the signature value extracting module 502 is specifically used to:

extract M signatures respectively for any sample in the given sample set according to M preset signatures; and process the extracted signatures to obtain M signature values of each sample in the given sample set.

Further, the signature value extracting module 502 processing the extracted signature to obtain M signature values of the given sample set specifically comprises:

performing numerical processing to the extracted signatures to obtain M signature values of each sample in the given sample set, wherein, the signature values are integer values.

In a particular implementation of the present application, the sample subset dividing module 503 is specifically used to:

generate a binary tree for the sample set using a binary tree algorithm; said given sample set is a root node of the binary tree, wherein number of samples corresponding to the root node is 2N, M decisions are made to the root node to form a binary tree with $2^M$ leaf nodes and a depth of M+1, and wherein, signature values of j-th (j=1, 2, 3, ..., M) signature are used as decision conditions for each decision.

Figure 6:
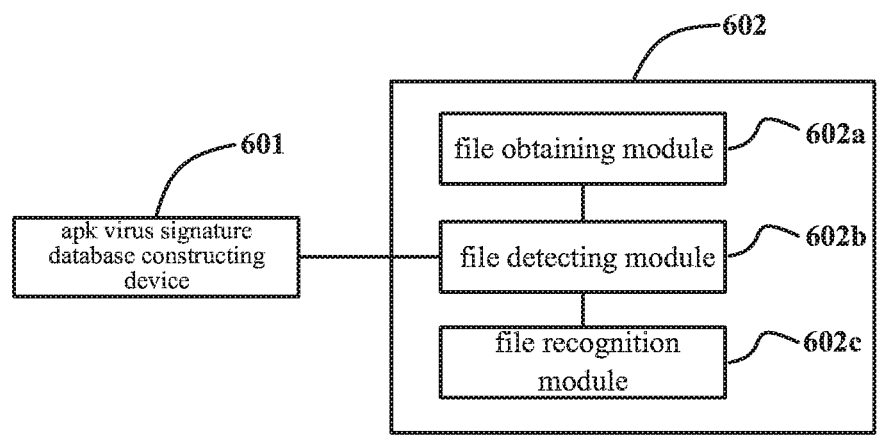
FIG. 6 is a schematic structure diagram of a system for detecting an apk virus according to an embodiment of the present application.

FIG. 6 is a structure schematic diagram of a system for detecting an apk virus according to an embodiment of the present application. As shown in FIG. 6, the system for detecting an apk virus comprises: an apk virus signature database constructing device 601 and an apk virus detecting device 602.

Specifically, the apk virus signature database constructing device 601 may comprise: a sample set obtaining module used to obtain a given sample set, wherein the sample set includes N normal apk file samples and N virus-infected apk file samples, and wherein, the apk file is an Android system application program installation package file, and N>1;

a signature value extracting module used to obtain M signature values respectively for any sample in the given sample set according to M preset signatures, wherein, each signature corresponds to 2 kinds of signature values;

a sample subset dividing module used to combine the signature values of the M signatures, and divide the given sample set into $2^M$ sample subsets according to the combined result;

a determining module used to, for any sample subset i (i=1, ..., $2^M$), determine whether the sample subset satisfies the following conditions:

a ratio of total number $Ci_{total}$ of samples in the subset to total number 2N of samples in the given sample set is greater than a preset first threshold and a ratio of total number $Ci_{virus}$ of virus-infected samples to $Ci_{total}$ is greater than a preset second threshold, if yes, determine a combination of signature values of M signatures corresponding to the sample subset i as a virus signature;

a virus signature database generating module used to generate an apk virus signature database comprising a plurality of virus signatures, wherein the apk virus signature database is used for detecting an apk file.

The apk virus detecting device 602 may comprise:

a file obtaining module 602a, which is used to obtain a target apk file;

a file detecting module 602b, which is used to construct the apk virus signature database constructed by the apk virus signature database constructing device 601 and detect the target apk file;

a file recognition module 602c, which is used to determine that the target apk file contains a virus when a subfile of the target apk file contains any one of virus signatures in the apk virus signature database.

In a particular implementation of the present application, the file detecting module 602b is specifically used to:

detect the subfiles with any one of the following types in the target apk file: classes.dex, androidmanifest.xml and manifest.mf, according to the apk virus signature database.

Figure 7:
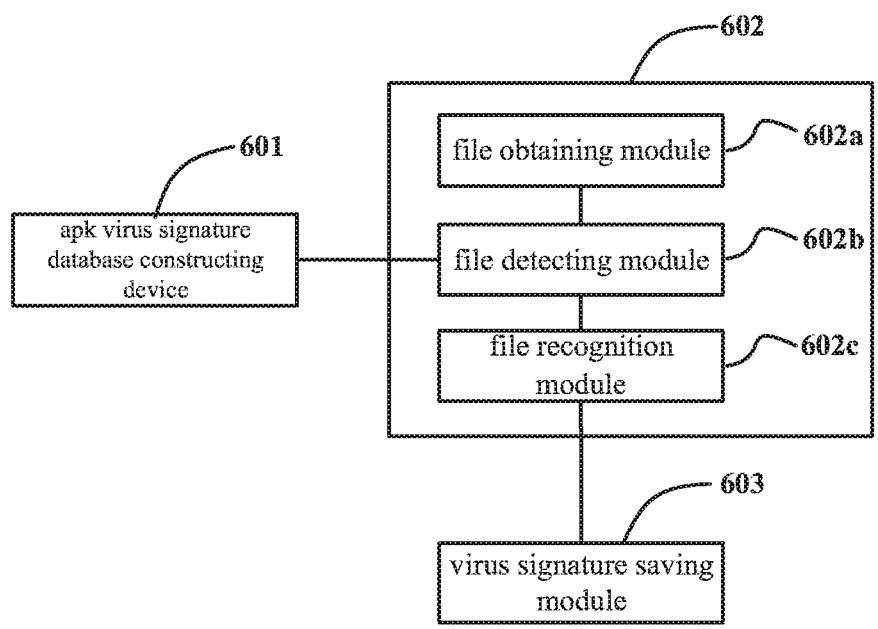
FIG. 7 is a schematic structure diagram of a system for detecting an apk virus according to another embodiment of the present application.

FIG. 7 is a structure schematic diagram of a system for constructing an apk virus signature database according to another embodiment of the present application. The system can further comprise:

a virus signature saving module 603, which is used to extract M signatures of the target file according to M preset signatures in case that the target apk file contains viruses; process the Extracted M signatures of the target apk file to obtain M signature values of the target apk file; and save the obtained M signature values of the target apk file.

In order to realize the above purposes, embodiments of the present application also provide a storage medium, wherein, the storage medium is used to store an application program which is used to perform the method for constructing an apk virus signature database described by the above embodiments of the present application, wherein, the method for constructing an apk virus signature database of said embodiment of the present application comprises:

obtaining a given sample set, wherein the sample set includes N normal apk file samples and N virus-infected apk file samples, and wherein, the apk file is an Android system application program installation package file, and N>1;

obtaining M signature values respectively for any sample in the given sample set according to M preset signatures, wherein, each signature corresponds to 2 kinds of signature values;

combining the signature values of the M signatures, and dividing the given sample set into $2^M$ sample subsets according to the combined result;

for any of the sample subsets i (i=1, ..., $2^M$), determining whether the sample subset satisfies the following conditions:

a ratio of total number $Ci_{total}$ of samples in the subset to total number 2N of samples in the given sample set is greater than a preset first threshold and a ratio of total number $Ci_{virus}$ of virus-infected samples to $Ci_{total}$ is greater than a preset second threshold, if yes, determining a combination of signature values of M signatures corresponding to the sample subset i as a virus signature; and generating an apk virus signature database comprising a plurality of virus signatures, the apk virus signature database being used for detecting an apk file.

In order to realize the above purposes, embodiments of the present application provide an application program, wherein the application program is used to perform the method for constructing an apk virus signature database described by the above embodiments of the present application, wherein the method for constructing an apk virus signature database of said embodiment of the present application comprises:

obtaining a given sample set, wherein the sample set includes N normal apk file samples and N virus-infected apk file samples, and wherein, the apk file is an Android system application program installation package file, and N>1;

obtaining M signature values respectively for any sample in the given sample set according to M preset signatures, wherein, each signature corresponds to 2 kinds of signature values;

combining the signature values of the M signatures, and dividing the given sample set into $2^M$ sample subsets according to the combined result;

for any of the sample subsets i (i=1, . . . , $2^M$), determining whether the sample subset satisfies the following conditions:

a ratio of total number $Ci_{total}$ of samples in the subset to total number 2N of samples in the given sample set is greater than a preset first threshold and a ratio of total number $Ci_{virus}$ of virus-infected samples to $Ci_{total}$ is greater than a preset second threshold, if yes, determining a combination of signature values of M signatures corresponding to the sample subset i as a virus signature; and generating an apk virus signature database comprising a plurality of virus signatures, the apk virus signature database being used for detecting an apk file.

In order to realize the above purposes, embodiments of the present application provide a system for constructing an apk virus signature database, comprising: at least a processor and a memory coupled to the at least a processor, wherein the memory is used to store executable program code; the at least a processor runs a program corresponding to the executable program code by reading the executable program code stored in the memory to perform the following steps obtaining a given sample set, wherein the sample set includes N normal apk file samples and N virus-infected apk file samples, and wherein, the apk file is an Android system application program installation package file, and N>1;

obtaining M signature values respectively for any sample in the given sample set according to M preset signatures, wherein, each signature corresponds to 2 kinds of signature values;

combining the signature values of the M signatures, and dividing the given sample set into $2^M$ sample subsets according to the combined result;

for any of the sample subsets i (i=1, . . . , $2^M$), determining whether the sample subset satisfies the following conditions:

a ratio of total number $Ci_{total}$ of samples in the subset to total number 2N of samples in the given sample set is greater than a preset first threshold and a ratio of total number $Ci_{virus}$ of virus-infected samples to $Ci_{total}$ is greater than a preset second threshold, if yes, determining a combination of signature values of M signatures corresponding to the sample subset i as a virus signature; and generating an apk virus signature database comprising a plurality of virus signatures, the apk virus signature database being used for detecting an apk file.

In order to realize the above purposes, in an embodiment of the present application, a system for detecting an apk virus comprises: at least a processor and a memory coupled to the at least a processor, wherein the memory is used to store executable program code; the at least a processor runs a program corresponding to the executable program code by reading the executable program code stored in the memory to perform the following steps for constructing an apk virus signature database:

obtaining a given sample set, wherein the sample set includes N normal apk file samples and N virus-infected apk file samples, and wherein, the apk file is an Android system application program installation package file, and N>1;

obtaining M signature values respectively for any sample in the given sample set according to M preset signatures, wherein, each signature corresponds to 2 kinds of signature values;

combining the signature values of the M signatures, and dividing the given sample set into $2^M$ sample subsets according to the combined result;

for any of the sample subsets i (i=1, . . . , $2^M$), determining whether the sample subset satisfies the following conditions:

a ratio of total number $Ci_{total}$ of samples in the subset to total number 2N of samples in the given sample set is greater than a preset first threshold and a ratio of total number $Ci_{virus}$ of virus-infected samples to $Ci_{total}$ is greater than a preset second threshold, if yes, determining a combination of signature values of M signatures corresponding to the sample subset i as a virus signature; and generating an apk virus signature database comprising a plurality of virus signatures, the apk virus signature database being used for detecting an apk file;

and wherein, the at least a processor further performs the following steps for detecting an apk virus:

obtaining a target apk file;

detecting the target apk file according to an apk virus signature database constructed by the device for constructing an apk virus signature database; and determining that the target apk file contains a virus when a subfile of the target apk file contains any one of virus signatures in the apk virus signature database.

It should be understood that, each part of the present application can be implemented by a hardware, a software, a firmware or a combination thereof. In the above implementation, multiple steps or methods can be implemented by a software of a firmware stored in a memory and executed by proper instruction executing system. For example, if it is implemented by a hardware, similar to that in another implementation, it can be implemented by any one of the following technologies known in the art or a combination thereof: a discrete logic circuit having a logic gate circuit for realizing the logical function of data signals, an application-specific integrated circuit having a proper combinational logic gate circuit, a Programmable Gate Array (PGA), a Field Programmable Gate Array (FPGA) etc.

In the description of the present description, descriptions of reference terms "an embodiment", "some embodiments", "example", "particular examples" or "some examples" means that particular characteristics, structures, materials or features described in combination with an embodiment or an example are contained in at least one embodiment or example. In the present description, schematic expressions for said terms do not necessarily refer to identical embodiments or examples. Moreover, the described particular characteristics, structures, materials or features can be combined in any one or more embodiment(s) or example(s) in any way.

Although embodiments of the present application has been shown and described, those ordinarily skilled in the art can understand that many variations, modifications, replacements and variants can be made to these embodiments without departing from the principle and objective of the present application, and the scope of the present application is defined by the claims and its equivalent.

The invention claimed is:

1. A method for constructing an Android system application program installation package (apk) virus signature database, characterized in that, the method comprises the following steps:
   obtaining a given sample set, wherein the sample set includes N normal apk file samples and N virus-infected apk file samples, and wherein, the apk file is an Android system application program installation package file, and N>1;
   obtaining M signature values respectively for any sample in the given sample set according to M preset signatures, wherein, each signature corresponds to 2 kinds of signature values;
   combining the signature values of the M signatures, and dividing the given sample set into $2^M$ sample subsets according to the combined result;
   for any of the sample subsets i (i=1, ..., $2^M$), determining whether the sample subset satisfies the following conditions:
   a ratio of a total number of samples in the subset to a total number 2N of samples in the given sample set is greater than a preset first threshold and a ratio of a total number of virus-infected samples to the total number of samples in the subset is greater than a preset second threshold,
   if yes, determining a combination of signature values of M signatures corresponding to the sample subset i as a virus signature; and
   generating an apk virus signature database comprising a plurality of virus signatures, the apk virus signature database being used for detecting an apk file.

2. The method according to claim 1, characterized in that, the step of obtaining M signature values respectively for any sample in the given sample set according to M preset signatures specifically comprises:
   extracting M signatures respectively for any sample in the given sample set according to M preset signatures; and
   processing the extracted signatures to obtain M signature values of each sample in the given sample set.

3. The method according to claim 2, characterized in that, the step of processing the extracted signatures to obtain M signature values of each sample in the given sample set specifically comprises:
   performing numerical processing to the extracted signatures to obtain M signature values of each sample in the given sample set, wherein, the signature values are integer values.

4. The method according to claim 1, characterized in that, the step of combining the signature values of the M signatures, and dividing the given sample set into $2^M$ sample subsets according to the combined result specifically comprises:
   generating a binary tree for the sample set using a binary tree algorithm; said given sample set is a root node of the binary tree, wherein number of samples corresponding to the root node is 2N, M decisions are made to the root node to form a binary tree with $2^M$ leaf nodes and a depth of M+1, and wherein, signature values of j-th (j=1, 2, 3, ..., M) signature are used as decision conditions for each decision.

5. The method according to claim 1, characterized in that, the step of detecting an apk file specifically comprises:
   obtaining a target apk file;
   detecting the target apk file according to the apk virus signature database; and
   determining that the target apk file contains a virus when a subfile of the target apk file contains any one of virus signatures in the apk virus signature database.

6. The method according to claim 5, characterized in that, in case that the target apk file contains a virus, the method further comprises:
   extracting M signatures of the target apk file according to the M preset signatures;
   processing the extracted M signatures of the target apk file to obtain M signature values of the target apk file; and
   saving the obtained M signature values of the target apk file.

7. The method according to claim 5, characterized in that, the step of detecting the target apk file according to the apk virus signature database specifically comprises:
   detecting subfiles with one of the following types in the target apk file: classes.dex, androidmanifest.xml and manifest.mf, according to the apk virus signature database.

8. The method according to claim 1, characterized in that, the M preset signatures are common detection signatures for 2N apk file samples in the given sample set.

9. The method according to claim 1, characterized in that, the first preset threshold is 5%.

10. The method according to claim 1, characterized in that, the second preset threshold is 95%.

11. A system for constructing an Android system application program installation package (apk) virus signature database, characterized in that, the system comprises: at least a processor and a memory coupled to the at least a processor, wherein the memory is used to store executable program code; the processor runs a program corresponding to the executable program code by reading the executable program code stored in the memory to perform the following steps:
   obtaining a given sample set, wherein the sample set includes N normal apk file samples and N virus-infected apk file samples, and wherein, the apk file is an Android system application program installation package file, and N>1;
   obtaining M signature values respectively for any sample in the given sample set according to M preset signatures, wherein, each signature corresponds to 2 kinds of signature values;
   combining the signature values of the M signatures, and divide the given sample set into $2^M$ sample subsets according to the combined result;
   for any sample subset i (i=1, ..., $2^M$), determining whether the sample subset satisfies the following conditions:
   a ratio of a total number of samples in the subset to a total number 2N of samples in the given sample set is greater than a preset first threshold and a ratio of total number of virus-infected samples to the total number of samples in the subset is greater than a preset second threshold, if yes, determining a combination of signature values of M signatures corresponding to the sample subset i as a virus signature; and generating an apk virus signature database comprising a plurality of virus signatures, wherein the apk virus signature database is used for detecting an apk file.

12. The system according to claim 11, characterized in that, the processor obtaining M signature values respectively for any sample in the given sample set according to M preset signatures specifically comprises:

extracting M signatures respectively for any sample in the given sample set according to M preset signatures; and processing the extracted signatures to obtain M signature values of each sample in the given sample set.

13. The system according to claim 12, characterized in that, the processor processing the extracted signature to obtain M signature values of the given sample set specifically comprises:

performing numerical processing to the extracted signatures to obtain M signature values of each sample in the given sample set, wherein, the signature values are integer values.

14. The system according to claim 11, characterized in that, the processor combining the signature values of the M signatures, and dividing the given sample set into $2^M$ sample subsets according to the combined result specifically comprises:

generating a binary tree for the sample set using a binary tree algorithm; said given sample set is a root node of the binary tree, wherein number of samples corresponding to the root node is 2N, M decisions are made to the root node to form a binary tree with $2^M$ leaf nodes and a depth of M+1, and wherein, signature values of j-th (j=1, 2, 3, . . . , M) signature are used as decision conditions for each decision.

15. The system according to claim 11, characterized in that, the M preset signatures are common detection signatures for 2N apk file samples in the given sample set.

16. The system according to claim 11, characterized in that, the first preset threshold is 5%.

17. The system according to claim 11, characterized in that, the second preset threshold is 95%.

18. A system for detecting an Android system application program installation package (apk) virus, characterized in that, the system comprises: at least a processor and a memory coupled to the at least a processor, wherein the memory is used to store executable program code; the at least a processor runs a program corresponding to the executable program code by reading the executable program code stored in the memory to perform the following steps for constructing an apk virus signature database:

obtaining a given sample set, wherein the sample set includes N normal apk file samples and N virus-infected apk file samples, and wherein, the apk file is an Android system application program installation package file, and N>1;

obtaining M signature values respectively for any sample in the given sample set according to M preset signatures, wherein, each signature corresponds to 2 kinds of signature values;

combining the signature values of the M signatures, and dividing the given sample set into $2^M$ sample subsets according to the combined result;

for any of the sample subsets i (i=1, . . . , $2^M$), determining whether the sample subset satisfies the following conditions:

a ratio of a total number of samples in the subset to a total number 2N of samples in the given sample set is greater than a preset first threshold and a ratio of total number of virus-infected samples to the total number of samples in the subset is greater than a preset second threshold, if yes, determining a combination of signature values of M signatures corresponding to the sample subset i as a virus signature; and generating an apk virus signature database comprising a plurality of virus signatures, the apk virus signature database being used for detecting an apk file;

and wherein, the at least a processor further performs the following steps for detecting an apk virus:

obtaining a target apk file;

detecting the target apk file according to an apk virus signature database constructed by the device for constructing an apk virus signature database; and determining that the target apk file contains a virus when a subfile of the target apk file contains any one of virus signatures in the apk virus signature database.

19. The system according to claim 18, characterized in that, the at least a processor further performs the following steps for detecting an apk virus:

extracting M signatures of the target file according to M preset signatures in case that the target apk file contains a virus; and processing the extracted M signatures of the target apk file to obtain M signature values of the target apk file; and saving the obtained M signature values of the target apk file.

20. The system according to claim 18, characterized in that, the at least a processor further performs the following step for detecting an apk virus:

detecting subfiles with any one of the following types in the target apk: file:classes.dex, androidmanifest.xml and ifest.mf.

* * * * *